United States Patent Office 3,718,063
Patented Feb. 27, 1973

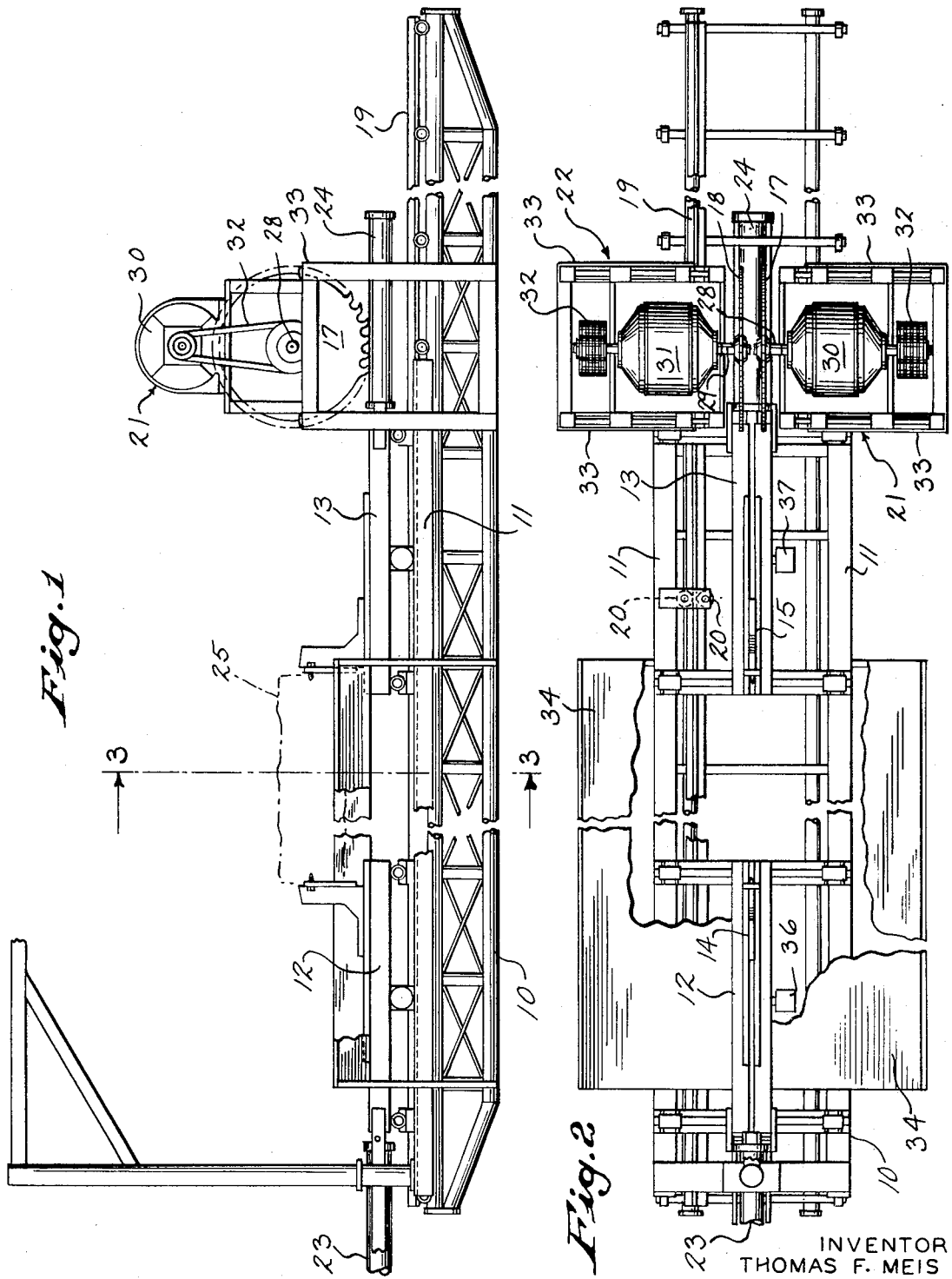

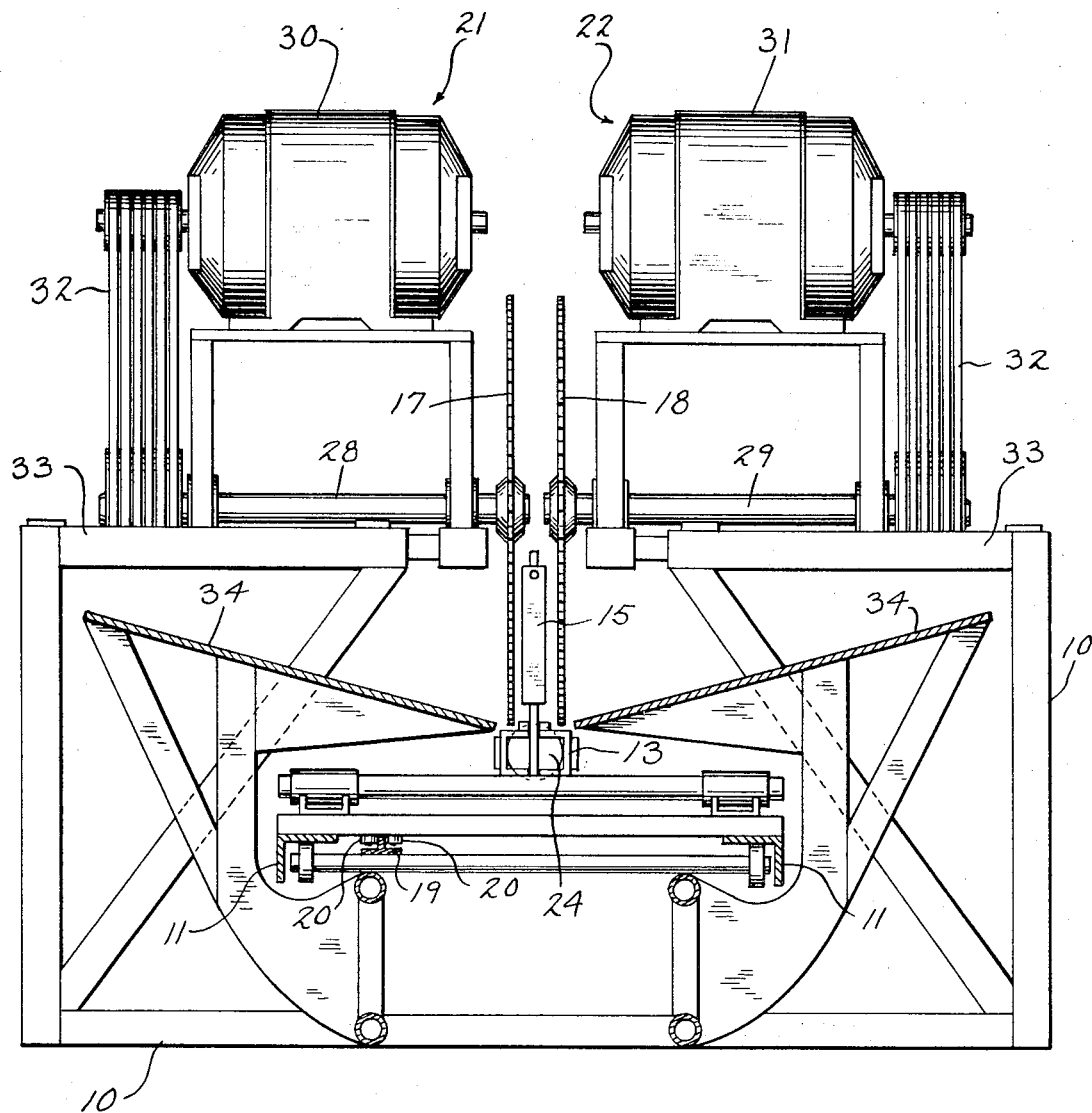

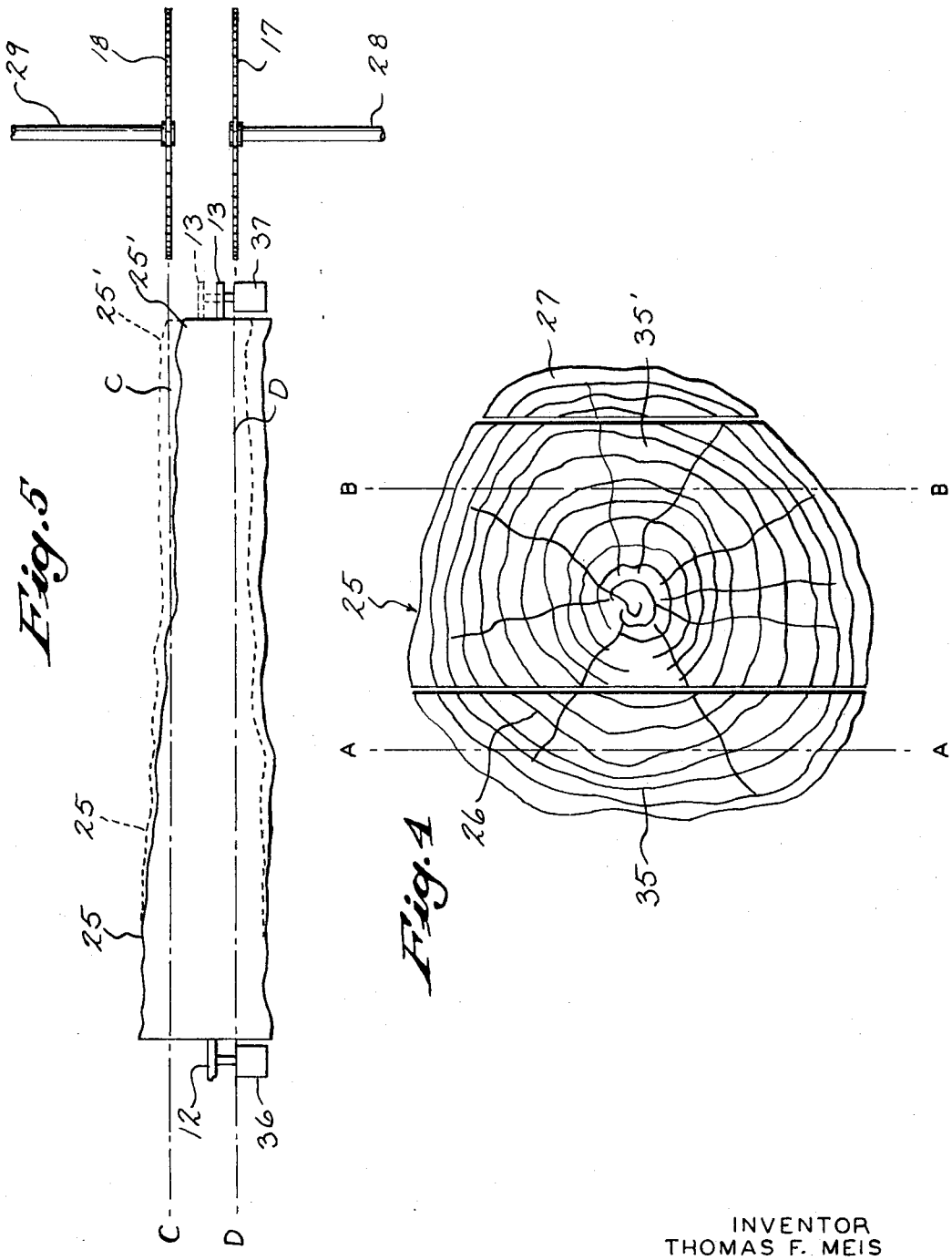

3,718,063
CANT-PRODUCING SAWMILLS
Thomas F. Meis, P.O. Box 27, Mondovi, Wis. 54755
Filed Oct. 14, 1970, Ser. No. 80,574
Int. Cl. B27b 7/00, 29/10
U.S. Cl. 83—471.2
1 Claim

ABSTRACT OF THE DISCLOSURE

An improved machine for sawing rough logs into so-called cants, or logs that have been slabbed to provide a partially finished log which is adapted to be fed into a gang saw to produce flat boards, which machine includes a pair of parallel, independently laterally-movable circular saw blade units together with a log-retaining headblock assembly which is also laterally adjustable to permit the operator to select the size of the cant produced, and also including means for adjusting the position of a somewhat crooked or imperfect log relative to said saw blades to ensure the production of consistently uniform, high-quality cants.

BACKGROUND OF THE INVENTION

Field of the invention

The present invention relates to a cant-producing sawmill including power-driven circular saw blades which are designed to cut slabs off the sides of a log so that the log or so-called cant is in suitable condition to be introduced into a multiple-blade gang saw or the like where it is cut into a plurality of flat boards.

Description of the prior art

Heretofore the power-driven sawmills utilized for producing cants from rough logs have not been entirely satisfactory for several reasons. For one thing, in many of said conventional machines the circular saw blades are not adjustable, toward or away from each other, with the result that cants of the same thickness are produced regardless of the initial diameter of the log, which is extremely wasteful. Moreover, with said conventional machines no means are provided for adjusting the position of the log relative to the saw blades with the result that if the log is not perfectly straight it will produce an irregular, inferior cant.

Examples of prior log-sawing and canting machines are disclosed in the following U.S. Pats.: No. 707,184; No. 2,672,896; No. 2,673,581; No. 2,651,335; No. 1,075,-918; No. 2,548,067; No. 2,550,360; No. 3,056,438; No. 3,213,906; and No. 2,964,074.

SUMMARY OF THE INVENTION

The present invention provides an improved machine specifically designed for the fast, efficient processing of logs, and particularly small diameter logs, into cants suitable for feeding into gang saws, where said cants are cut into flat boards.

Primarily the present invention is an improvement over conventional machines intended for the same general purpose in that the present machine enables the operator to readily select the size of the cant produced, as well as permitting him to mechanically adjust the position of each log relative to the saw blades to produce the most uniform, high quality cant possible, thereby ensuring the production of the maximum number of boards from each cant.

A further object of the present invention is to provide an improved machine which is unique in that it will process both hardwood and softwood logs, which is not possible with most existing sawmills of the general type here involved.

A further object of the invention is to provide a new machine which is particularly well adapted for producing cants from small logs of the type that will only yield one cant per log, although it is to be understood that said machine design can also be advantageously utilized in the processing of larger logs as well.

A further object is to provide an improved cant-producing machine which is relatively simple in design, as well as inexpensive in construction.

Still further objects of the present invention are to provide a new and improved cant-producing sawmill which is relatively economical to operate, which is simple to use, which is rugged and long-lasting in construction, which can be either stationary or portable, and which machine is otherwise particularly well adapted for its intended purposes.

BRIEF DESCRIPTION OF THE DRAWINGS

In the accompanying drawings illustrating one preferred form of the present invention, the same reference numerals designating the same parts in all of the views:

FIG. 1 is a side elevational view of the improved cant-producing sawmill;

FIG. 2 is a top plan view of the machine;

FIG. 3 is a transverse vertical sectional view of the machine taken along line 3—3 of FIG. 1;

FIG. 4 is an end view of a log showing, in full lines, the non-uniform cant produced when a log is not properly aligned with the dual arbor blades, the showing in dot and dash lines illustrating the more uniform cant produced with the present machine; and FIG. 5 is a diagrammatic top plan view showing, in full lines, a log misaligned relative to the rotary cutting blades, while the broken lines illustrate the log adjusted for proper alignment with the blades.

DESCRIPTION OF THE PREFERRED EMBODIMENT

Referring now more particularly to FIGS. 1–3 of the drawings, the improved cant-producing sawmill comprising the present invention includes an elongated main frame 10 upon which there is mounted a power-driven carriage 11 similar to conventional sawmill carriages and adapted to traverse said frame from one end to the other. Said carriage 11 is provided with a pair of headblocks 12, 13 mounted at opposite ends thereof, said headblocks being positioned in parallel alignment with a pair of spaced parallel circular saw blades 17, 18 carried by motor-arbor saw units 21, 22. A conventional log chute 34 is provided for feeding the logs to be canted into the machine.

The precise alignment of said headblocks 12, 13 relative to the saw blades 17, 18 is critical, as will be hereinafter described in greater detail. Said alignment is maintained as the carriage traverses the frame by means of a guide rail 19 mounted on the frame together with coacting cam followers 20 (FIGS. 2 and 3) carried by the carriage.

Within the headblocks 12, 13 are mounted knee elements 14, 15, respectively, which are movable toward or away from each other by means of two hydraulic or pneumatic cylinders 23, 24 controlled by a single valve. As is shown in FIG. 1, the log 25 to be canted is held rigidly in place by the squeezing action of said adjustable headblock knees 14, 15 positioned at the ends thereof. Thus the log 25 is securely retained in position as it is engaged by said spaced saw blades 17, 18 during the operation of the present machine, as will be more fully described.

As best appears in FIG. 3 of the drawings, the circular saw blades 17, 18 in the present invention are mounted on horizontal shafts 28, 29, respectively, which are rotatably drivably connected to motors 30, 31 by means of V-belts 32 or the like. Said motor-arbor saw units 21, 22 are slidably mounted on tracks 33 (FIG. 2) which permit movement of the same perpendicular to the headblocks 12, 13. The slidable adjustment of said blade members 17, 18 is preferably equal, but independent.

In most installations it has been found that a lateral adjustment distance of two inches for each of said saw blades 17, 18 provides satisfactory results. Said parallel blades are normally spaced four inches apart in the preferred embodiment of the present invention, thus permitting a maximum adjusted spacing of eight inches between said blades, which is entirely sufficient when canting relatively small-diameter logs. In this respect, however, it is to be understood that the present machine can be readily enlarged to accommodate logs of larger sizes, if desired, and the invention is not to be limited or confined in this respect.

With the illustrated form of the present invention when the first arbor saw 17 is shifted outwardly on its sliding mount by two inches it results in a spacing of six inches between saw blades 17, 18. When the second arbor saw 18 in similarly shifted laterally outwardly two inches the spacing between said blades is, of course, increased to eight inches. Thus it will be seen that with the illustrated unit either four inch, six inch, or eight inch cants can be obtained from a given log, and the operator is given a selection of the size of cant produced.

The advantage obtained by the readily adjustable nature of the present machine is that when a particular log is not quite large enough in diameter to provide an eight inch cant, one of the independently-adjustable blade members 17, 18 can be shifted inwardly two inches. In such an instance, however, it is undesirable that a relatively large slab be cut from one side of the log while a much thinner slab is removed from the other side of said log. Such a situation is illustrated in full lines in FIG. 4 of the drawings wherein the log 25 has a relatively large slab 26 cut from one side thereof with a much smaller slab 27 removed from the other side. The result is a non-uniform cant which does not permit the production of as many full-sized boards therefrom as can be obtained when the slabs removed from the opposite sides of the cant are more equal in thickness, as represented by the slabs 35, 35' defined by the simulated cut lines A—A, B—B in said FIG. 4.

To eliminate, or greatly reduce, the problem of non-uniform slabs being cut from the opposite sides of the log the present invention includes a pair of hydraulic or pneumatic cylinder and piston units 36, 37 (FIGS. 1, 2, and 5) which are associated with the aforementioned laterally-adjustable headblocks 12, 13, respectively, said cylinder units being independently controllable by the operator to shift said individual headblocks laterally as desired. In the preferred form of the invention the maximum lateral movement of said headblocks is about one inch, or one-half of the lateral travel of the arbor saw units 17, 18. This enables the operator to quickly, accurately, and positively divide the total offset of one saw exactly in half relative to its effect on the log. As a result, through the lateral adjustment of both the arbor saw units as well as the headblocks, substantially equal slabs can be removed from both sides of the log, thus providing a cant which will yield the maximum number of full sized boards when said cant is run through a gang saw.

An additional important feature inherent in the present machine is that the independently laterally movable nature of each of the headblock units 12, 13, through the action of the cylinders 36, 37, permits the accurate adjustment and positioning of imperfect or crooked logs relative to the saw blades in order to obtain maximum lumber yield therefrom. In this respect, the operator can laterally shift the position of one end of such a log in relation to the saws while the other end of said log remains fixed, thereby continuously effecting a substantially straight alignment of said log in relation to the saws. As is shown in FIG. 5, for example, the forward end 25' of a somewhat crooked log 25 can be shifted by means of the cylinder and piston unit 37 which bears against the forward headblock 13 from the illustrated misaligned full line position to the position shown in broken lines, wherein the lateral shifting of the headblock on the carriage functions to accurately align said log with the saw blades 17, 18 and projected saw lines C, D. The result is optimum utilization of the log regardless of its shape, and with consequent maximum board production.

In addition to the above-described novel structural innovations incorporated in the present invention, the complete machine also includes, of course, other elements such as the log loading, cant discharge, slab removal, sawdust removal, and carriage drive means, but inasmuch as said elements are well-known in the art they have not been illustrated or described in detail herein. Moreover, since said conventional structural elements are subject to change or modification, depending upon the design of the particular installation, it is not desired to restrict or confine the novel machine comprising the present invention in this respect.

The principal object of the present invention, as hereinabove described, is to provide a new and improved log canting machine which is specifically designed so that the rotary saw blades and the log-retaining headblocks can be readily independently adjusted by the operator to obtain a cant of an exact selected size and uniformity, and which provides maximum lumber recovery from the log. In addition, with the present invention means are provided permitting the accurate adjustment and alignment of the log relative to the saw blades in order to obtain the maximum number of boards from the cant regardless of the shape of the log.

Further objects of the present invention are to provide an improved cant-producing sawmill which is particularly well adapted for processing relatively small diameter logs, but which basic machine design can be readily adapted to accommodate logs of any size. Moreover, the present machine is relatively inexpensive in design, economical to operate, and is rugged and long-lasting in construction.

It is to be understood, as hereinabove mentioned, that while one preferred form of the present invention has been described herein, numerous variations or modifications thereof will undoubtedly occur to those skilled in the art. What is intended to be covered herein, therefore, is not only the illustrated embodiment of the invention but also any variations or modifications thereof as may come within the spirit of said invention.

What I claim is:

1. A portable cant-producing sawmill for cutting logs of non-uniform contours, comprising: an elongated main frame including a longitudinal guide rail; a power-driven carriage mounted on and adapted to traverse said main frame, there being cam followers on said carriage engageable with said frame guide rail to maintain said carriage in position on said frame as it traverses the same; a pair of headblocks movably mounted adjacent opposite ends of said carriage, said headbolcks having upright knee elements thereon clampingly engageable with the ends of the log to be canted, and said headblocks being laterally movable on said carriage within predetermined limits; operator-controlled power-actuated cylinder means for shifting said headblock knees longitudinally into and out of their log-clamping position; a pair of spaced power-driven rotary saw blade units laterally-movably mounted on said main frame intermediate its length, each of said units including a vertically-disposed circular saw blade; operator-controlled power-actuated means for independently shifting said motor and saw units laterally a predetermined distance to vary the spacing between said blades; operator-controlled power-actuated cylinder and piston means for shifting said headblock knees independently laterally on the frame, thereby permitting the operator to adjust and align the position of the log on the carriage relative to said saw blades, the lateral adjustability of said saw blades together with the lateral adjustability of said headblock knees permitting the operator to select the thickness of the cant produced as said log is conveyed through said rotary saw blades regardless of variations in the contour of said log.

References Cited

UNITED STATES PATENTS

| | | | |
|---|---|---|---|
| 3,180,377 | 4/1965 | Pinder | 143—117 |
| 24,743 | 7/1859 | Kurtzeman | 143—117 |
| 259,551 | 6/1882 | Kester | 143—117 X |
| 3,276,492 | 10/1966 | Kervefors | 143—37 R |
| 3,349,818 | 10/1967 | Standal | 143—52 R |
| 2,803,272 | 8/1957 | Crosby, Jr. | 143—37 B |
| 707,184 | 8/1902 | Thomas | 143—37 R |

ANDREW R. JUHASZ, Primary Examiner

J. F. COAN, Assistant Examiner

U.S. Cl. X.R.

83—485, 373